US007971984B2

(12) United States Patent
Lopez et al.

(10) Patent No.: US 7,971,984 B2
(45) Date of Patent: Jul. 5, 2011

(54) SYSTEMS AND METHODS FOR VARYING DYE CONCENTRATIONS

(75) Inventors: Matthew Grant Lopez, Escondido, CA (US); Nancy Eng Wilson, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 27 days.

(21) Appl. No.: 12/196,228

(22) Filed: Aug. 21, 2008

(65) Prior Publication Data

US 2008/0309745 A1 Dec. 18, 2008

Related U.S. Application Data

(62) Division of application No. 10/976,390, filed on Oct. 29, 2004, now Pat. No. 7,431,435.

(60) Provisional application No. 60/599,464, filed on Aug. 6, 2004.

(51) Int. Cl.
*C09D 11/00* (2006.01)

(52) U.S. Cl. .......................................... 347/100; 347/86

(58) Field of Classification Search .................. 347/100, 347/86
See application file for complete search history.

(56) References Cited

U.S. PATENT DOCUMENTS

| | | | | |
|---|---|---|---|---|
| 4,682,187 | A | 7/1987 | Martner | |
| 5,781,210 | A * | 7/1998 | Hirano et al. | 347/51 |
| 5,786,835 | A | 7/1998 | Ikeda et al. | |
| 6,199,979 | B1 * | 3/2001 | Hobson et al. | 347/93 |
| 6,441,349 | B1 | 8/2002 | Rangarajan et al. | |
| 7,431,435 | B2 * | 10/2008 | Lopez et al. | 347/84 |
| 2001/0006396 | A1 | 7/2001 | Iida | |
| 2001/0030676 | A1 | 10/2001 | Owaki et al. | |
| 2002/0080394 | A1 * | 6/2002 | Ogasahara et al. | 358/1.15 |
| 2002/0126172 | A1 | 9/2002 | Akiyama | |
| 2002/0191046 | A1 * | 12/2002 | Otsuki | 347/43 |
| 2003/0146952 | A1 | 8/2003 | Numata et al. | |
| 2004/0145635 | A1 | 7/2004 | Ebisawa et al. | |
| 2006/0023036 | A1 | 2/2006 | Langford et al. | |

* cited by examiner

*Primary Examiner* — Laura E Martin

(57) ABSTRACT

Systems and methods for varying dye loads. A fluid ejection apparatus includes a reservoir and an assembly. The reservoir stores ink with a first dye load and the assembly receives the ink with the first dye load from the reservoir. To obtain ink with higher dye load, the assembly evaporates a portion of the liquid solvent in the ink to obtain ink with a higher dye load.

25 Claims, 6 Drawing Sheets

SYSTEMS AND METHODS FOR VARYING DYE CONCENTRATIONS

CROSS-REFERENCE TO RELATED APPLICATIONS

This application is a divisional of Ser. No. 10/976,390, filed Oct. 29, 2004 now U.S. Pat. No. 7,431,435 which claims the benefit of U.S. Provisional Application No. 60/599,464, filed on Aug. 6, 2004, and which are hereby incorporated by reference.

BACKGROUND

Today's fluid ejection devices, such as inkjet printers, can deliver impressive print quality at reasonable costs. Users are increasingly using their inkjet printers for creating high-resolution prints, such as digital photographs. Manufacturers of inkjet printers are constantly trying to meet the ever-increasing demand for better print quality.

One way to improve print quality is to increase the range of color intensity that is utilized to print an image. Having a wide range of color intensity allows the production of printed images with more color variations and smoother color transitions. Conventional inkjet printers typically use a color set of a few base colors (e.g., cyan, magenta, yellow and black) and an ink reservoir for each base color. One technique for varying the intensity of colors in an area of a printed image is to vary the size and the number of ink droplets in that area. However, the color intensity variation produced by this technique is limited.

Another technique of obtaining a wider range of color intensity is by using two or more reservoirs for each color where each reservoir contains ink with a different color intensity. Because more ink reservoirs are required, this technique significantly increases the mechanical complexity, cost, and the maintenance requirements of the printer. In particular, users are required to monitor and, when necessary, replace multiple ink reservoirs.

Thus, there is a need for a printing system that is capable of producing prints with a wide range of color intensity without unduly sacrificing the resolution of the prints or significantly increasing the system's mechanical complexity and maintenance requirements.

BRIEF DESCRIPTION OF THE DRAWINGS

The systems and methods discussed herein are illustrated by way of example and not limitation in the figures of the accompanying drawings. Similar reference numbers are used throughout the figures to reference like components and/or features.

DETAILED DESCRIPTION

The systems and methods described herein provide a fluid ejection device and method of operation suitable for use with printing systems and other systems that utilize fluid ejection devices. Although particular examples described herein refer to inkjet printing devices and systems, the systems and methods discussed herein are applicable to any fluid ejection device or component.

Figure 1:
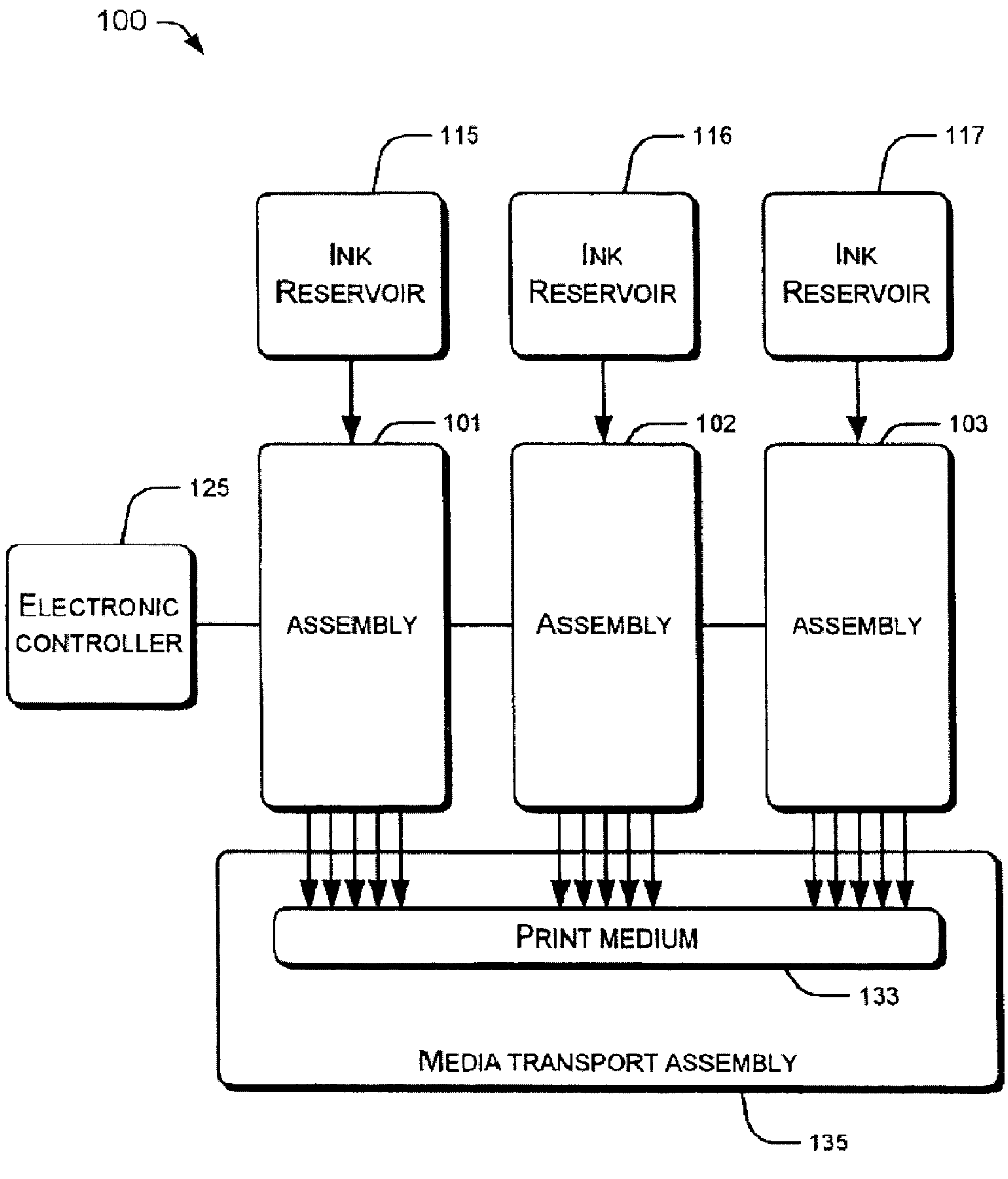
FIG. 1 illustrates a block diagram of an embodiment of a printing system.

FIG. 1 illustrates a block diagram of an embodiment of a printing system 100. For illustrative purposes, printing system 100 is shown to include assemblies 101-103, ink reservoirs 115-117, electronic controller 125 and media transport assembly 135. In practice, printing system 100 may include more or less components than those shown in FIG. 1.

Media transport assembly 135 is configured to handle print media, such as print medium 133. In particular, media transport assembly 135 is configured to position print medium 133 relative to assemblies 101-103 during printing. The operations of media transport assembly 135 are controlled by electronic controller 125. Print medium 133 may include any type of material such as paper, card stock, transparencies, Mylar and the like.

Assemblies 101-103 are configured to deliver drops of ink on print medium 133. Assemblies 101-103 may be configured to move relative to print medium 133 or vice-versa. Electronic controller 125 may coordinate the movements of assemblies 101-103 and print medium 133 to obtain the desired relative positions during printing. Each of the assemblies 101-103 may include multiple nozzles. Drops of ink are ejected toward print medium 133 through these nozzles as assemblies 101-103 and print medium 135 are moved relative to one another. Typically, the nozzles are arranged in one or more columns (or arrays) such that properly sequenced ejection of drops of ink from the nozzles causes characters, symbols, and/or other graphics or images to be printed on print medium 133.

In one embodiment, assemblies 101-103 may include one or more print heads that eject drops of ink. In operation, energy is applied to resistors or other energy-dissipating elements in the print head, which transfers the energy to ink in one or more nozzles or orifices in the print head. This application of energy to the ink causes a portion of the ink to be ejected out of the nozzle toward the print medium 133. As ink is ejected from the nozzle, additional ink is received into the nozzle from the ink reservoir inside or outside the assemblies 101-103.

Each of assemblies 101-103 is typically configured to print in a particular color and is configured to receive ink from one of the ink reservoirs 115-117 containing ink of that color. Each of the ink reservoirs 115-117 typically has ink that is composed of a liquid solvent and a dye of a particular color. The concentration of the dye, whether in terms of parts per a base amount or percentage, in the ink, may be referred to as the dye load of the ink. Ink in reservoirs 115-117 may include any type of liquid solvent, such as water, alcohols and the like. Alcohols generally have a lower latent heat of vaporization than water (about ⅓) and require less energy to be evaporated. Typically, the ink includes a solvent of both water and alcohols, which account for 70%-80% of the total ink volume.

In one embodiment, assemblies 101-103 are configured to print in cyan, magenta, and yellow and to receive ink of these colors from the corresponding ink reservoirs 115-117. In other embodiments, other colors may be used instead of or in addition to these colors. For example, printing system 100 may include an assembly that is configured to print in grey scale and to receive ink from an ink reservoir containing black ink.

In one embodiment, assemblies 101-103 and the corresponding ink reservoirs 115-117 may be housed together in inkjet cartridges or pens. These pens may be of a removable variety such that the nozzles and reservoirs are replaced together by a user. The pens may also be integrated with a replaceable ink reservoir.

In another embodiment, ink reservoirs 115-117 are separate from assemblies 101-103 and supply ink to assemblies 101-103 through an interface connection, such as a supply tube. In either embodiment, ink reservoirs 115-117 may be removed, replaced, or refilled. In one embodiment, where assemblies 101-103 and ink reservoirs 115-117 are housed together in inkjet cartridges, each of the ink reservoirs 115-117 includes a local reservoir located within the ink cartridge as well as a larger reservoir located separately from the ink cartridge. In this embodiment, the separate, larger reservoir serves to refill the local reservoir. The separate, larger reservoir and/or the local reservoir can be removed, replaced, or refilled.

Assemblies 101-103 are configured to produce print areas with a wide range of color intensity. To vary the color intensity in a print area, assemblies 101-103 may vary the size of the ink drops and the number of ink drops within that area. To achieve an even wider range of color intensity, each of the assemblies 101-103 is particularly configured to vary the dye load of the ink from its corresponding ink reservoir. Varying the dye load of the ink in ink reservoirs enables assemblies 101-103 to print with more variations of color and provide smoother color transitions than using ink with a single dye load. The components and the methods for varying ink dye load will be discussed in more detail in conjunction with FIG. 2. Briefly stated, assemblies 101-103 are configured to increase the dye load of the ink in ink reservoirs 115-117 by removing some of the liquid solvent from the ink. To do so, assemblies 101-103 are configured to apply heat to a volume of ink to evaporate a portion of the liquid solvent in that volume. The resulting volume of ink has a higher dye load than the ink in the reservoir. By printing with ink with a regular dye load in simultaneously with ink with the higher dye load, assemblies 101-103 can produce better print quality without increasing the number of ink reservoirs.

Electronic controller 125 is configured to control the operations of printing system 100. For example, electronic controller 125 may control how media transport assembly 135 positions print medium 133. Electronic controller 125 may also control the movements and printing operations of assemblies 101-103. In a particular embodiment, electronic controller 125 provides timing control for ejection of ink drops by assemblies 101-103. Electronic controller 125 defines a pattern of ejected ink drops that form characters, symbols, and/or other graphics or images on print medium 133. Timing control and the pattern of ejected ink drops may be determined by, for example, the print job commands and/or command parameters. In one embodiment, logic and drive circuitry forming a portion of electronic controller 125 is incorporated in an integrated circuit (IC) located on assemblies 101-103. In another embodiment, logic and drive circuitry is located off assemblies 101-103.

Particularly, electronic controller 125 may control assemblies 101-103 to vary the dye loads of the ink provided from one or more of ink reservoir 115-117. For example, electronic controller 125 may also selectively control variance of the dye loads, how much to vary the dye load, and how much ink is to be treated. In one embodiment, the dye load of the ink is varied by applying heat to the ink so that liquid solvent is evaporated, thereby decreasing the amount of solvent in the ink.

Electronic controller 125 is also configured to receive data from a host system, such as a computer, and includes memory capable of temporarily storing the data. Typically, the data is sent to printing system 100 along an electronic, infrared, optical, or other information transfer path. The data may represent a document, an image, or any file to be printed. In one embodiment, the data forms a print job for printing system 100 and includes one or more print job commands and/or command parameters.

Figure 2:
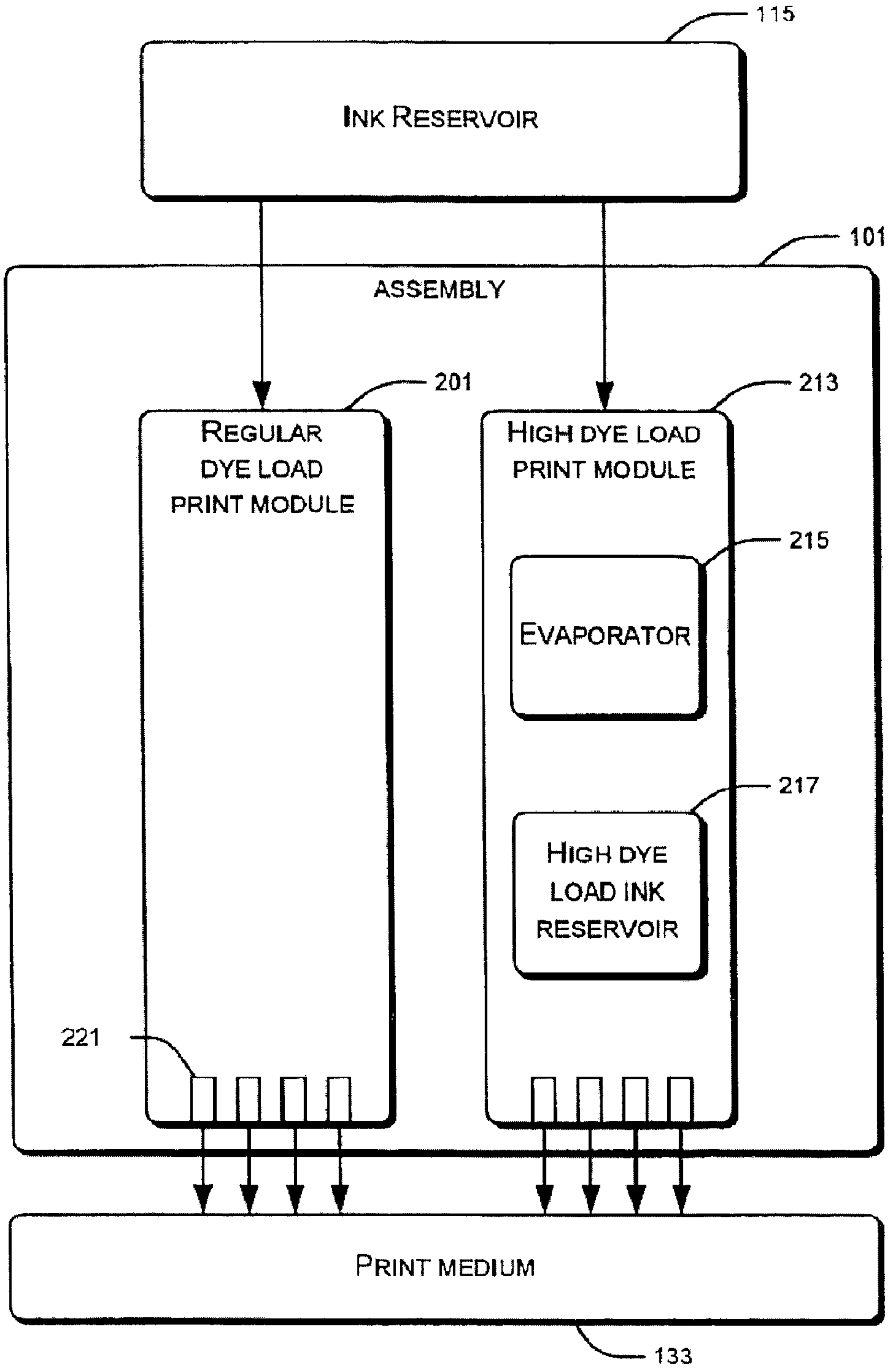
FIG. 2 illustrates a block diagram of an embodiment of a print head assembly.

FIG. 2 illustrates a block diagram of an embodiment of an assembly 101. For illustrative purposes, assembly 101 is shown to include both a regular dye load print module 201 and a higher dye load print module 213, however, an assembly may include only one of them. Both modules include nozzles 221 and 222 respectively. Higher dye load print module 213 may also include an evaporator 215 and a higher dye load ink reservoir 217. As referred to herein, evaporator 215 is any structure that can apply heat to a liquid and then remove, whether by vacuum, filter, valve, membrane, or other evacuation or removal techniques, most of the evaporated liquid while minimizing the loss of any condensed liquid.

Regular dye load print module 201 is configured to print with ink directly from ink reservoir 115, i.e. that is to utilize ink having substantially the same dye load as the ink contained in ink reservoir 115. Ink is ejected onto print medium 133 through nozzles 221. Regular dye load print module 201 may vary the color intensity of a print on print medium 133 by regulating size of the ink drops ejected from nozzles 221 and how many of the nozzles 221 are used to produce the print.

Higher dye load print module 213 is configured to provide ink with a higher dye load from reservoir 115 and use the volume of higher dye load ink for printing. Higher dye load print module 213 may include evaporator 215 to increase the dye load in the ink. An embodiment of evaporator 215 will be discussed in more detail in conjunction with FIG. 4. In one embodiment, evaporator 215 may be configured to apply heat to a volume of ink thereby evaporating some of the liquid solvent in that volume. Evaporator 215 may also be configured with an opening to remove the solvent vapor from the volume.

Evaporator 215 may be configured to process and directly feed higher dye load ink to nozzles 222 during printing. Evaporator 215 may be regulated by a controller to achieve proper dye load in the ink. For example, evaporator 215 may include a feedback system for this purpose. A feedback system may include a device or structure that measures the amount of solvent being evaporated, or the rate at which the evaporated solved flows from the evaporator, and then provides this information to the controller that can alter the amount of energy provided by the evaporator to either increase or decrease the amount of solvent being evaporated.

In some embodiments, to provide more consistent dye load in the ink, higher dye load print module 213 may be configured with higher dye load ink reservoir 217 to store ink processed by evaporator 215. Higher dye load ink from evaporator 215 may be stored in higher dye load ink reservoir 217, which feeds the ink to nozzles 221. Evaporator 215 may be configured to process more ink when the ink in higher dye load ink reservoir 217 has been consumed and needs replenishing through the use of an ink level detector in higher dye load ink reservoir 217.

In yet another embodiment, evaporator 215 may include a set of nozzles for injecting regular dye load ink into a chamber. When the regular dye load ink is injected in the chamber, the temperature of the ink increases, causing some of the solvent in the ink to evaporate. Thus, the ink in the chamber has a higher dye load and can be used by higher dye load print module 213 for printing.

Assembly 101 may be configured differently from the one represented in FIG. 2. For example, assembly 101 may include multiple print modules that each print using ink with different dye loads than each other print module. In another embodiment, evaporator 215 and higher dye load ink reservoir 217 may be located separately from higher dye load print module 213. Also, regular dye load print module 201 and higher dye load print module 213 may be implemented in a single structure using a common set of nozzles 221 that are provided both the regular dye load ink and the higher dye load ink, either independently or in conjunction.

In certain embodiments, assembly 101 is a structure formed on a print carriage that moves relative to a media, that may also be moving. In other embodiments, assembly 101 is one or more structures formed in different locations. For example, evaporator 215 may be formed at a stationary location away from a print carriage, with flexible tubing or other fluid flow paths to a print head or a storage container that is located on the print carriage.

Figure 3:
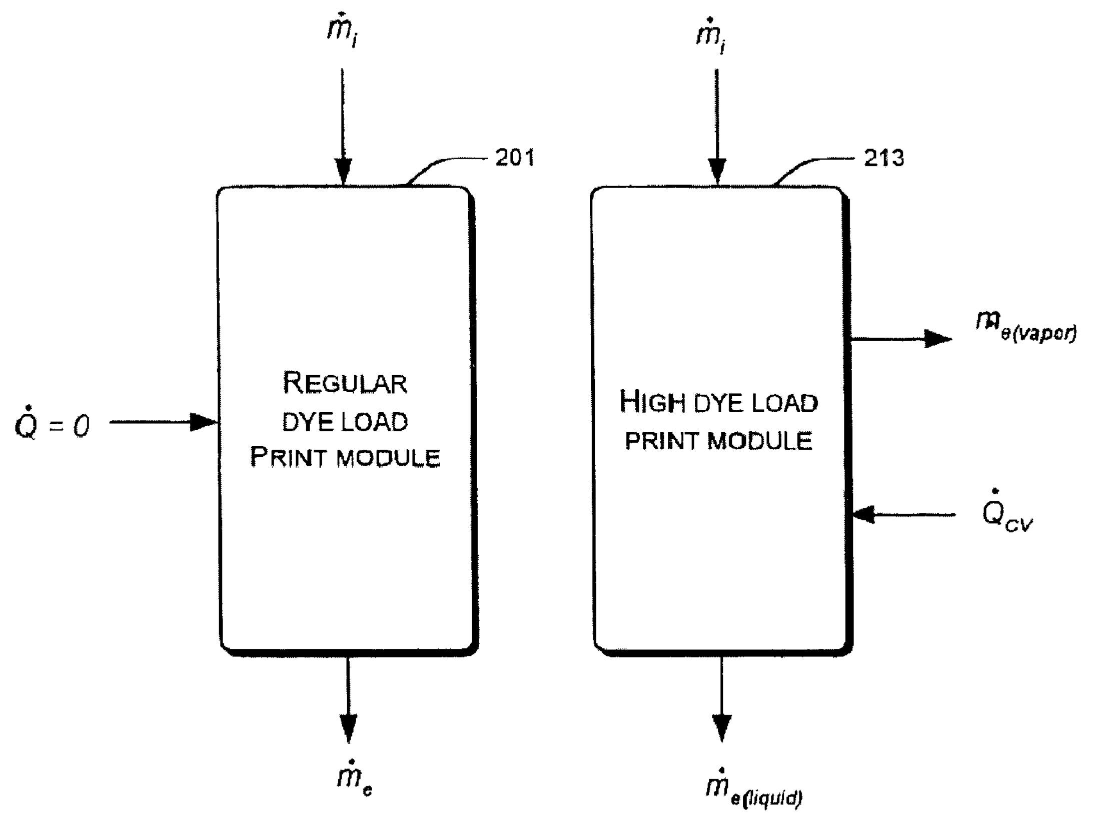
FIG. 3 illustrates a block diagram illustrating an embodiment of the fluid mechanics and the thermodynamics associated with an embodiment of a higher dye load print module and a regular dye load print module.

FIG. 3 illustrates a block diagram illustrating the fluid mechanics and the thermodynamics associated with an embodiment of a higher dye load print module 213 and a regular dye load print module 201.

For regular dye load print module 201, the mass flow of the ink is conserved and may be presented by $$\dot{m}_i = \dot{m}_e$$

where $\dot{m}_i$ represents the inlet mass flow and $\dot{m}_e$ represents the exit mass flow. There is no heat flow to the regular dye load print module 201. So, $$\dot{Q} = 0$$

where $\dot{Q}$ represents the heat flow to or from the control volume

For higher dye load ink reservoir 213, heat is applied to the inlet mass flow (e.g., by an evaporator). The thermodynamic conditions in higher dye load ink module 213 may be generally represented by $$\dot{Q}_{cv} + \dot{m}_i\left(h_i + \frac{V_i^2}{2} + gz_i\right) = \dot{W}_{cv} + \dot{m}_e\left(h_e + \frac{V_e^2}{2} + gz_e\right)$$

where $\dot{Q}_{cv}$ represents the heat flow being applied to the control volume; $\dot{W}_{cv}$ represents the work being done by the control volume; h is the specific enthalpy associated with the fluid composition in the mass flow; $V^2/2$ represents the kinetics energy of the mass flow; and gz represents the potential energy of the mass flow.

Assume that the work and the differences in potential and kinetic energy of the inlet and exit mass flow are not significant, the heat flow being applied to the control volume may be represented by $$\dot{Q}_{cv} = \dot{m}_e(h_e) - \dot{m}_i(h_i)$$

However, as illustrated in FIG. 3, the heat applied to the inlet mass flow of ink causes a portion of the liquid solvent in the ink to evaporate to form solvent vapor. So, the heat flow being applied to the control volume may be more accurately represented by $$\dot{Q}_{cv} = \dot{m}_{e(liquid)}(h_{e(liquid)}) + \dot{m}_{e(vapor)}(h_{e(vapor)}) - \dot{m}_{i(liquid)}(h_{i(liquid)})$$

The heat flow required to attain a particular dye load in the ink may be calculated using this equation.

For example, at inlet ink temperature of 20 degrees C., air temperature of 40 degrees C., and isobaric conditions of 1 atmosphere, typical values for specific enthalpy values are $h_{i(liquid)} = 167$ kJ/kg $h_{e(liquid)} = 167$ kJ/kg $h_{e(vapor)} = 2406$ kJ/kg In one embodiment, assuming a vapor loss mass of 30% and an inlet mass flow of 0.00675 g/sec, a typical value of the heat flow required is $$\begin{aligned}\dot{Q}_{cv} &= 0.00675\ \text{g/sec} \times [(167)(0.7) + (2406)(0.3) - (167)]\ \text{kJ/kg} \\ &= 4.53\ \text{Watts}\end{aligned}$$

Figure 4:
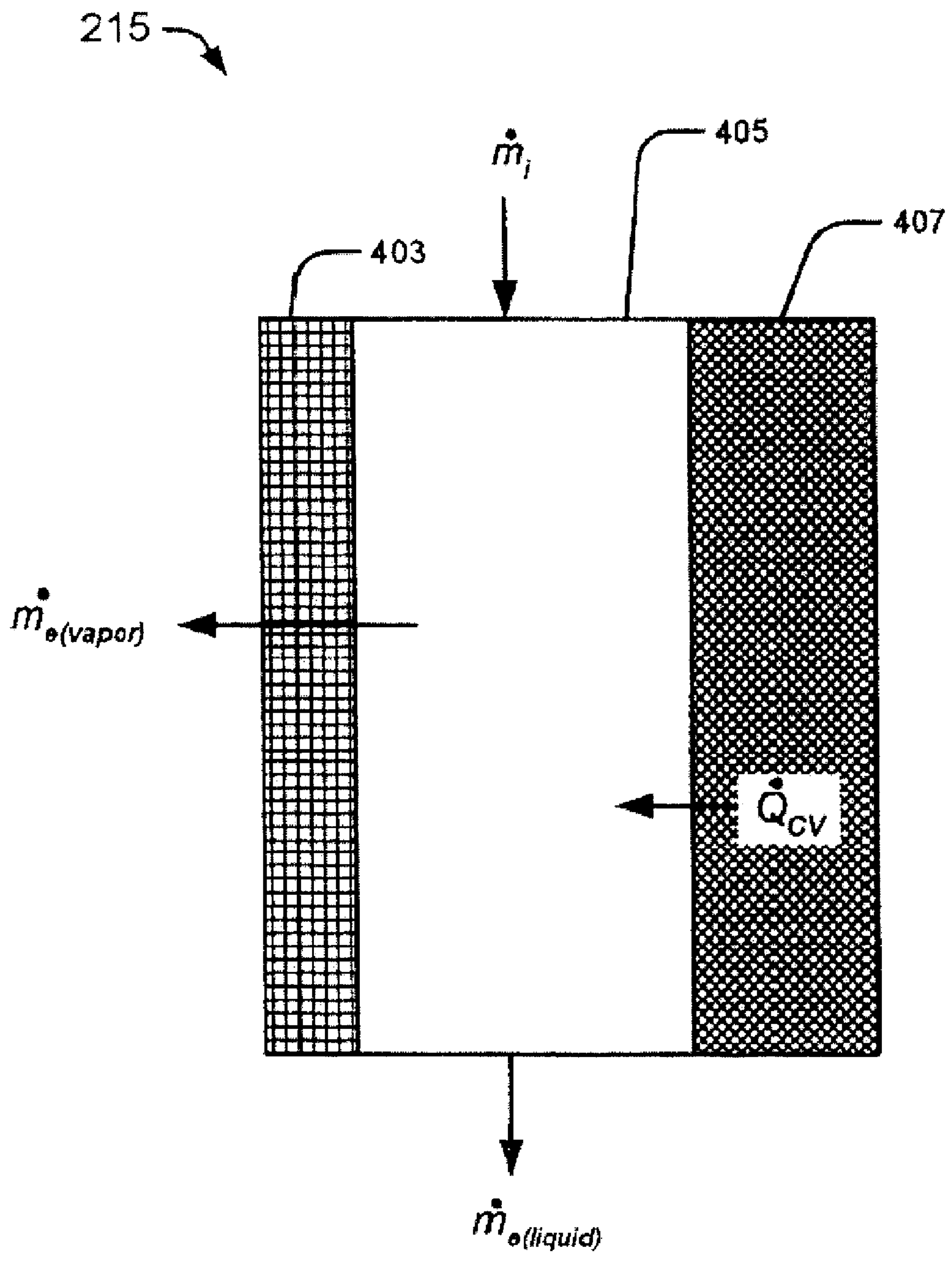
FIG. 4 illustrates a block diagram illustrating a cross sectional view of an embodiment of an evaporator.

FIG. 4 a block diagram illustrating a cross sectional view of an embodiment of evaporator 215 is illustrated. Evaporator 215 includes plenum 405, heater 407 and filter 403. Plenum 405 provides an enclosure for a volume of ink for processing by evaporator 215. Plenum 405 may be integrated in a tube for delivering ink from an ink reservoir to nozzles on an assembly. Plenum 405 may also be a chamber specifically dedicated for heating the ink. The mass flow of ink into and out of plenum 405 may or may not be continuous, e.g. a valve may be installed at an end of the plenum from which ink with the higher dye load flows in order to control the rate and time of the outflow of the ink with higher dye load.

Heater 407 is configured to heat the ink in plenum 405 to evaporate some of the liquid solvent in the ink. Many types of heaters may be used for this purpose. In one embodiment, an electrical foil heating element, such as a Kapton® heater, is used for heater 407. Typically, heater 407 is coupled to an electrical power source that supplies a proper amount of electricity to heater 407. The amount of electricity is a function of the amount of heat to be transferred to the ink stored in and/or flowing into plenum 405. In one embodiment, heater 407 is integral with a wall of plenum 405. In other embodiments, heater 407 is placed in contact with or adjacent to one or more walls of plenum 405.

In certain embodiments heater 407 applies energies to raise an average temperature within plenum 405 to be no greater than approximately 65 degrees Celsius.

A controller of an inkjet printer system may control the amount of electricity provided to heater 407 to obtain the desired dye load in the ink. The controller may also be configured to dynamically control the dye load by varying the amount of electricity going to heater 407 in real time. To increase the accuracy of the heating process, the controller may control the amount of heat generated by heater 407 based on conditions of the ink and the environment, such as ambient air temperature, ink temperature, and ambient air humidity.

In another embodiment, evaporator 215 may heat the ink by injecting the ink through nozzles into plenum 405 instead of using heater 407. (Not shown). The controller may control the amount and the frequency of ink injection to achieve the desired dye load for the ink.

Filter 403 provides an opening for vapor to escape. When heater 407 provides heat flow to the ink in plenum 405, liquid solvent in the ink is heated and may evaporate to form solvent vapor. Filter 403 allows the solvent vapor to escape while preventing the ink from leaking from plenum 405. In one embodiment, filter 403 comprises a microporous membrane that is normal to the vertical axis of evaporator 405, as depicted in FIG. 4. In such embodiments, hydrophobic membranes, such as perfluorocarbon polymer based membranes with porosities of about 40% to about 80% may be used. Filter 403 may be made with any material that allows the solvent vapor to pass but is impervious to the liquid solvent, such as a fiberglass screen mesh, a perforated aluminum sheet, and the like. In further embodiments, the porosity of filter 403 may be sized as a function of ink viscosity.

Figure 5:
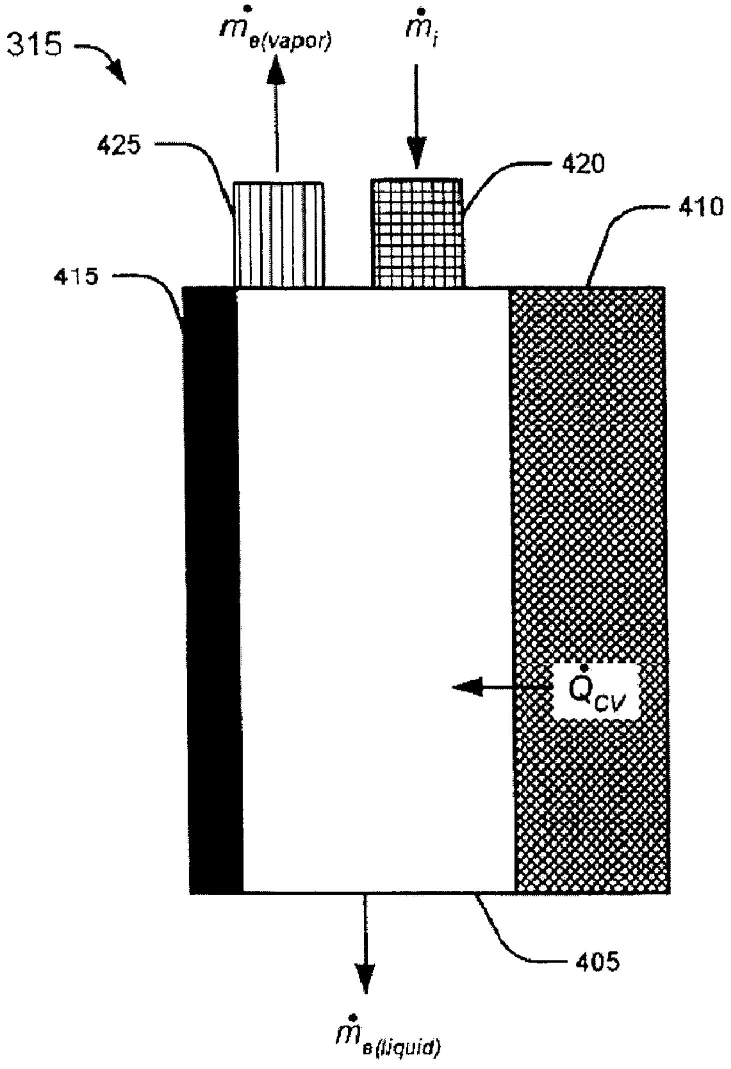
FIG. 5 illustrates a block diagram illustrating a cross-sectional view of another embodiment of an evaporator.

FIG. 5 a block diagram illustrating a cross sectional view of another embodiment of evaporator 315 is illustrated. In the embodiment of FIG. 5, heater 410 may be similar to the heater 407 described with respect to FIG. 4. However, filter 403 is replaced by an impermeable wall or membrane 415.

Further, inlet 420 provides a fluidic path for ink to flow into plenum 405. Also, located near a top of plenum 405, here depicted as being on a same surface of plenum 405 as inlet 420, is a valve 425. Valve 425 may be any type of seal that may be mechanically, electrically, magnetically, or pressure activated to an open position to allow the solvent vapor to escape. In certain embodiments, valve may be selectively opened based upon timing or when pressure in plenum 405 exceeds a predetermined threshold.

Figure 6:
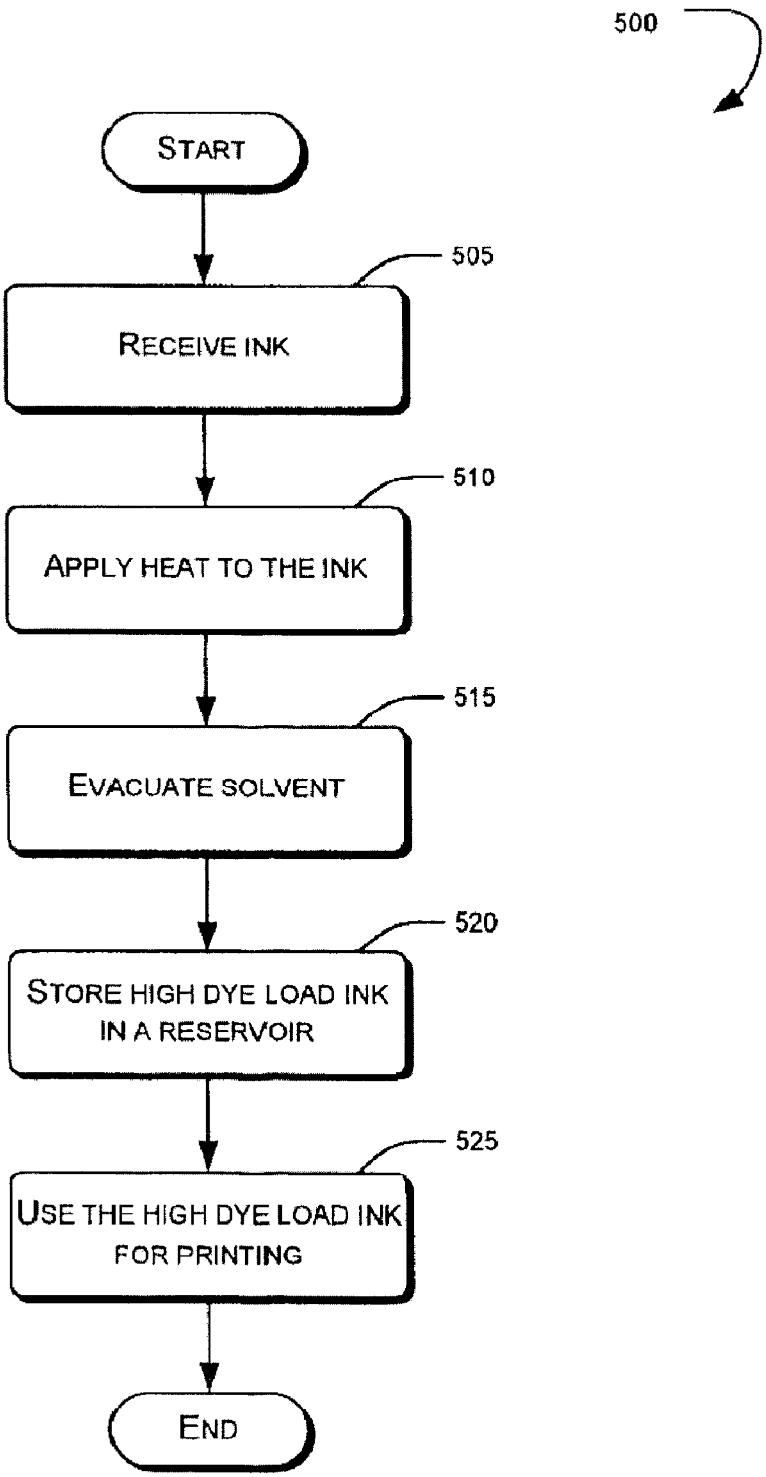
FIG. 6 illustrates an operational flow diagram illustrating an embodiment of a process for changing the dye load in ink.

FIG. 6 is an operational flow diagram illustrating an example process 500 for changing the dye load in ink. Process 500 may be implemented, for example, by an assembly in an printing system to increase the dye load of ink in an ink reservoir. Moving from a start block, process 500 goes to block 505 where ink is received. Typically, the ink is fed to the assembly from the ink reservoir. At block 510, heat is applied to the ink. The assembly may include an evaporator with a heater that channels heat flow to the ink. The heat flow causes some of the liquid solvent in the ink to evaporate. At block 515, the solvent vapor is removed. The assembly may include a screen that allows the solvent vapor to escape. A variable seal between the assembly and the ink reservoir may also be used to remove the solvent vapor. The variable seal may be mechanically, electrically, magnetically, or pressure activated to an open position to allow the solvent vapor to escape.

At block 520, the higher dye load ink is stored in a local reservoir. The assembly may access the higher dye load ink from this local reservoir without continuously processing regular dye load ink from the main reservoir. At block 525, the assembly uses the higher dye load ink for printing and the process ends.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A fluid ejection apparatus comprising:

a first ink reservoir to store ink with a first dye load; and an assembly configured to receive the ink with the first dye load from the first ink reservoir, evaporate a portion of the ink with the first dye load to generate ink with a second dye load that is higher than the first dye load, store the ink with the second dye load in a second ink reservoir separate from the first ink reservoir, and eject drops of the ink with the second dye load.

2. A fluid ejection apparatus comprising:

a first reservoir to store ink with a first dye concentration; and an assembly comprising an evaporator fluidically coupled with the first reservoir and configured to receive ink with the first dye concentration from the first reservoir and heat the ink with the first dye concentration to evaporate some of the ink with the first dye concentration to generate ink with a second dye concentration different than the first dye concentration;

a print head including energy-dissipating elements configured to eject drops of the ink with the second dye concentration; and a second reservoir separate from the first reservoir and fluidically coupled between the evaporator and the print head to store the ink with the second dye concentration prior to the ink with the second dye concentration being ejected by the print head.

3. The fluid ejection apparatus of claim 2, wherein the evaporator includes a plenum providing an enclosure for a volume of ink for processing by the evaporator, the plenum configured to receive an inlet mass flow of ink with the first dye concentration from the first reservoir and deliver an exit mass flow of ink with the second dye concentration to the second reservoir.

4. The fluid ejection apparatus of claim 2, wherein the evaporator includes a heater configured to receive electrical signals and to apply heat to the ink having the first dye concentration.

5. The fluid ejection apparatus of claim 2, wherein the evaporator includes a filter that allows evaporated ink to be removed.

6. The fluid ejection apparatus of claim 5, wherein the filter includes a microporous membrane.

7. The fluid ejection apparatus of claim 6, wherein the microporous membrane comprises a perfluorocarbon polymer based membrane.

8. The fluid ejection apparatus of claim 6, wherein the microporous membrane includes a porosity of about 40% to about 80% for evaporated ink.

9. The fluid ejection apparatus of claim 2, wherein the evaporator includes a valve that allows evaporated ink to be removed.

10. The fluid ejection apparatus of claim 9, wherein the valve is actuated by one of a mechanically, electrically, magnetically, or pressure.

11. A method for operating a fluid ejection device comprising:

receiving ink with a first dye load in an evaporator;

evaporating, in the evaporator, a portion of the ink with the first dye load to generate ink with a second dye load that is greater than the first dye load; and ejecting both the ink with the first dye load and the ink with the second dye load.

12. The method of claim 11, further comprising storing the ink with the first dye load in a first reservoir prior to ejecting the ink with the first dye load, and storing the ink with the second dye load in a second reservoir separate from the first reservoir prior to ejecting the ink with the second dye load.

13. The method of claim 11, wherein evaporating the ink with the first dye load includes dynamically controlling the amount of ink with the first dye load that is evaporated.

14. The method of claim 11, further comprising ejecting the ink with the first dye load simultaneously with ejecting the ink with the second dye load.

15. The method of claim 11, further comprising ejecting the ink with the first dye load at a time that is different than ejecting the ink with the second dye load.

16. A method of operating a fluid ejection device comprising:

receiving ink with a first dye concentration from a first reservoir;

altering the ink to generate ink with a second dye concentration that is greater than the first dye concentration;

storing the ink with the second dye concentration in a second reservoir separate from the first reservoir;

receiving ink with the second dye concentration from the second reservoir; and ejecting both the ink with the first dye concentration and the ink with the second dye concentration.

17. The method of claim 16, further comprising evaporating the ink with the first dye concentration to generate the ink with the second dye concentration.

18. The method of claim 17, wherein evaporating the ink with the first dye concentration includes dynamically controlling the amount of ink with the first dye concentration that is evaporated.

19. The method of claim 16, further comprising ejecting the ink with the first dye concentration simultaneously with ejecting the ink with the second dye load.

20. The method of claim 16, further comprising ejecting the ink with the first dye concentration at a time that is different than ejecting the ink with the second dye concentration.

21. A fluid ejection apparatus comprising:

means for receiving ink with a first dye load, evaporating a portion of the ink with the first dye load to obtain ink with a second dye load greater than the first dye load, and removing the ink with the first dye load that is evaporated; and means for ejecting both the ink with the first dye load and the ink with the second dye load.

22. The fluid ejection apparatus of claim 21, wherein the means for evaporating further comprises means for varying the portion of the ink with the first dye load that is evaporated.

23. The fluid ejection apparatus of claim 21, further comprising means for storing the ink with the second dye load before ejecting the ink with the second dye load.

24. The fluid ejection apparatus of claim 21, wherein the means for removing comprises means for filtering the ink with the first dye load that is evaporated.

25. A fluid ejection apparatus comprising:

a reservoir to store ink with a first dye concentration; and an assembly comprising a chamber fluidically coupled with the reservoir;

a heater to heat the ink with the first dye concentration within the chamber and evaporate some of the ink with the first dye concentration to generate ink with a second dye concentration different than the first dye concentration;

a filter coupled with the chamber to remove evaporated ink from the chamber; and a print head fluidically coupled with the chamber and configured to eject the ink with the second dye concentration.

* * * * *